May 20, 1952     W. J. McGOLDRICK     2,597,789
AIRCRAFT CONTROL APPARATUS
Filed Oct. 7, 1948
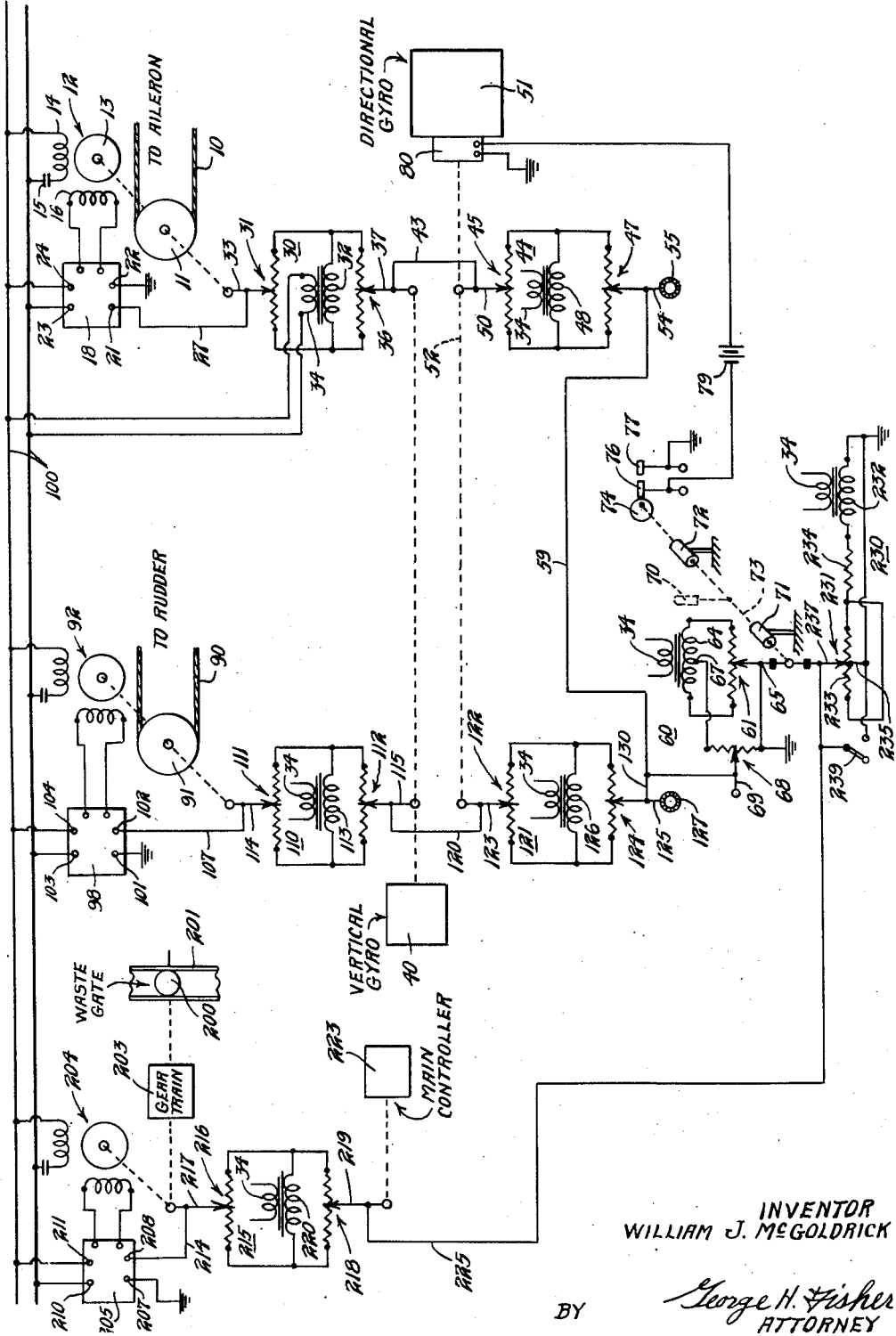
INVENTOR
WILLIAM J. McGOLDRICK
BY *George H. Fisher*
ATTORNEY Patented May 20, 1952

2,597,789

UNITED STATES PATENT OFFICE 2,597,789

AIRCRAFT CONTROL APPARATUS

William J. McGoldrick, Edina, Minn., assignor to Minneapolis-Honeywell Regulator Company, Minneapolis, Minn., a corporation of Delaware Application October 7, 1948, Serial No. 53,245

4 Claims. (Cl. 244—77)

This invention pertains to apparatus for controlling the flight of an aircraft and for controlling an engine that propels said aircraft.

An object of this invention is to provide apparatus for an aircraft which compensates for the normal loss of vertical lift incurred by said aircraft when it is placed in a banked turn.

A further object of this invention is to control the flight of an aircraft so that its air speed is modified while its direction of flight is being changed.

A further object of this invention is to vary the power of the propelling means for an aircraft while its direction of flight is being changed due to operation of the control surfaces of the aircraft.

A further object of this invention is to provide apparatus for an aircraft wherein operation of a manually operable member controls the movements of the control surfaces of an aircraft and also controls the supercharger for an engine that propels the aircraft to vary the engine power upon operation of said control surface.

A further object of this invention is to provide apparatus for an aircraft wherein the operation of a manually operable member controls the movements of control surfaces which cause the aircraft to incline or bank about its longitudinal axis and thereby to change its course and concomitantly controls the manifold pressure or power of the engine that propels the aircraft to increase the power output of said engine as the aircraft changes its course while banked.

A further object of this invention is to provide apparatus for an aircraft wherein the operation of a member effects movement of a control surface of the aircraft and also varies the power output of the propelling means for the aircraft and wherein said variation in power is maintained even though said control surface is returned to unoperated position.

A further object of this invention is to provide an aircraft with apparatus for automatically maintaining a desired direction of flight of said aircraft and having a manually operable means for controlling the change and direction of flight of said aircraft and for changing the power of the aircraft propelling mechanism in response to the operation of the manually operable means.

A further object of this invention is to provide an aircraft with apparatus for automatically maintaining the aircraft on a desired course and having a selectively operable member for controlling the operation of control surfaces for changing the course of the aircraft and for varying the power of the propelling means for the aircraft wherein said variation of power is maintained during the change in course of said aircraft.

A further object of this invention is to provide apparatus for an aircraft which automatically operates the control surfaces of said aircraft to maintain said aircraft on a desired course and in a desired position about its longitudinal axis, which also provides for the controlling of the movements of said control surfaces to change the course of said aircraft and the position of the aircraft about its longitudinal axis, and which further provides for the varying of the power of the propelling means for the aircraft in proportion to the movements of the control surfaces.

These and other objects of the invention will become apparent from a consideration of the description and drawing of a preferred embodiment of said invention.

The single figure comprising the drawings illustrates the invention applied to the conventional type of aircraft.

Control of the conventional aircraft about its longitudinal or roll axis whereby the plane may be banked is obtained by ailerons mounted near the extremities of the wings. Control of the aircraft about the turn axis whereby the course of the aircraft may be altered is obtained by the operation of the ailerons and of a rudder. The conventional type of aircraft is propelled by an aircraft engine whose power may be varied by the operation of an exhaust gas driven turbosupercharger. The turbosupercharger in turn may be controlled by a waste gate valve such as shown in the patent to Taylor No. 2,388,350 issued November 6, 1945.

Referring to the figure, the ailerons not shown are connected to cables 10 extending from a cable drum 11. The cable drum 11 is driven by an aileron servomotor 12. The motor 12 may be any suitable reversible motor. The motor 12 is illustrated as a reversible capacitor motor having field windings 14, 16 which coact with a rotor 13. One end of field winding 14 is directly connected to one side of line 100 which is supplied by alternating current from a source not shown. The opposite end of winding 14 is connected to the other side of line 100 through a capacitor 15. Coil 16 is connected to the output terminals of amplifier 18. The amplifier 18 in a manner well known in the art controls the direction of rotation of motor 12 in that such rotation is determined by the phase relationship between the voltage across terminals 23, 24 of amplifier 18 which are connected to the line 100 and the voltage across terminals 21, 22 of amplifier 18 which are connected to the signal input circuit.

The amplifier signal input circuit extends from terminal 21 of amplifier 18, through lead 27, impedance network 30, lead 43, an impedance network 44, lead 59, an impedance network 60, to ground, and to grounded terminal 22 of amplifier 18.

The impedance network 30 comprises an aileron servomotor balance potentiometer 31 and a vertical flight gyro roll axis potentiometer 36 whose resistors are connected in parallel across the ends of a secondary winding 32 of a transformer having a primary winding 34. The primary winding 34 is connected across the line 100. In the several networks to be described, the secondary winding in each network may have a common primary winding; consequently, the same reference character is used throughout to identify the primary winding. A wiper 33 of the servo balance potentiometer is operatively driven by servomotor 12. The wiper 37 of the roll axis potentiometer is operatively driven by a vertical gyro 40. The vertical flight gyro 40 is of a type well known in the art and it functions to stabilize wiper 37 as the aircraft tilts about its longitudinal or roll axis.

It may be seen that impedance network 30 is in the form of a Wheatstone bridge the output members being constituted by the wipers 33 and 37. Normally the wipers 33, 37 are at the electrical centers of their respective resistors at which time the bridge has no output voltage. If wiper 33 be moved, the bridge will have an output voltage across the wipers 33 and 37 with the phase of the voltage with respect to that across line 100 depending upon the direction in which wiper 33 is moved from its center position. Wiper 33 is connected by means of lead 27 to amplifier terminal 21.

The impedance network 44 comprises a directional gyro banking potentiometer 45 and a centering potentiometer 47 whose resistors are connected in parallel across the ends of a secondary winding 48 of a transformer having a primary winding 34. A wiper 50 of the directional gyro banking potentiometer 45 is operatively driven by a directional gyro 51 through an operative connection 52. The directional gyro 51 may be of the type disclosed in the application of Willis H. Gille No. 447,989 filed June 22, 1942. A wiper 54 of the centering potentiometer 47 may be adjusted over the potentiometer resistor by the manually operable knob 55. Network 44 is similar to network 30 with wipers 50, 54 constituting the output members. Wiper 50 is connected by lead 43 to wiper 37 of prior network 30.

The impedance network 60 comprises a formation stick potentiometer 61 whose resistor is connected across the ends of a secondary winding 64 of a transformer having a primary winding 34. A wiper 65 of the formation stick potentiometer 61 is carried in insulated relation by a formation stick spindle 73. A trimmer potentiometer 68 has its resistor connected at one end to a center tap 67 of secondary winding 64 and has its opposite end connected to wiper 65. One end of the trimmer potentiometer resistor is also connected to ground. Wiper 69 of the trimmer potentiometer is connected by lead 59 to wiper 54 of network 44.

The spindle 73 which carries the wiper 65 of the formation stick potentiometer supports a selectively operable control handle 70. The spindle 73 is mounted intermediate its ends in bearings 71 and 72. Fixed to the spindle 73 on the end opposite to that supporting the wiper 65 is a cam 74 which coacts with two spaced contacts 76 and 77. The spaced contacts 76 and 77 are closed when the cam 74 is moved from a normal position and when so closed complete a circuit through a battery 79 to a directional arm lock 80 which is of the type described in the aforesaid application of Willis H. Gille. The directional arm lock 80, when energized, prevents the transmission of motion between the directional gyro 51 and the wiper 50 of the banking potentiometer 45. A slip clutch (not shown) is interposed between the gyroscope 51 and the arm lock 80 to permit their relative movement.

Having described the mechanism for controlling the operation of the ailerons, we may proceed with the description of the mechanism for controlling the rudder of the aircraft.

The rudder (not shown) is connected to cables 90 extending from a cable drum 91. The drum 91 is driven by a rudder servomotor 92. The motor 92 may be similar to motor 12 which operates the aileron drum 11. The motor 92 will therefore not be described in detail it being evident from the illustration that the motors 92 and 12 are similarly arranged.

The motor 92 is reversibly controlled by an amplifier 98. As with the aileron servomotor 12, the direction of rotation of rudder servomotor 92 depends upon the phase relationship between the voltage across terminals 103 and 104 connected to the line 100 and the voltage across the signal input terminals 101, 102 connected to the input circuit of amplifier 98.

The signal input circuit to the rudder servomotor amplifier 98 extends from terminal 102, through lead 107, impedance network 110, lead 120, impedance network 121, lead 130, impedance network 60, to ground and to the grounded terminal 101 of amplifier 98.

The impedance network 110 comprises a rudder servomotor balance potentiometer 111 and a vertical gyro rudder potentiometer 112 with the potentiometers having their resistors connected in parallel across the ends of a secondary winding 113 of a transformer having a primary winding 34. The servo balance potentiometer 111 has a wiper 114 operatively driven from the rudder servomotor 92. The vertical flight gyro rudder potentiometer 112 has a wiper 115 operatively driven from the vertical gyro 40 in response to movements of the aircraft about its roll axis. The impedance network 110, as described and like network 30, 44, constitutes a Wheatstone bridge with the wipers 114, 115 being the output members of the bridge. Normally wipers 114 and 115 are at the electrical centers of their respective resistors at which time there is no voltage developed across the wipers. Lead 107 from terminal 102 of amplifier 98 is connected to wiper 114.

The impedance network 121 comprises a directional gyro rudder potentiometer 122 and a centering potentiometer 124 having resistors which are connected in parallel across the ends of a secondary winding 126 of a transformer having a primary winding 34. A wiper 123 of the rudder potentiometer is operatively driven by the directional gyro 51 through the operative connection 52 in response to deviations of the aircraft from a selected heading. A wiper 125 of the centering potentiometer 124 may be adjusted over the potentiometer resistor through the control knob 127. The network 121 is also in the form of a Wheatstone bridge with the wipers 123, 125 representing the output members of the bridge. Lead 120 connects the wiper 115 of the vertical gyro rudder potentiometer 112 with wiper 123 of the directional gyro rudder potentiometer 122. Lead 130 connects the wiper 125 of the centering potentiometer 124 with the wiper 69 of the trimmer potentiometer 68 of impedance network 60.

It is now apparent that each of the input circuits of amplifiers 13 and 98 consists of a group of series connected impedance networks which separate networks may individually set up a control signal voltage.

With respect to the supercharger for controlling the propelling means of the aircraft, only a portion of its control mechanism is necessary for the realization of the mode in which the invention is applied. A complete supercharger and aircraft engine arrangement is disclosed in the aforementioned patent to Taylor, Number 2,388,350. Such supercharger as shown in the patent includes an exhaust gas driven turbine whose speed may be controlled by a waste gate similar to waste gate 200 herein. Waste gate 200 is positioned in a conduit 201 illustrated in section, which constitutes a by-pass around the turbine. The speed of the supercharger turbine is determined by the degree of opening of the waste gate 200. The waste gate 200 is positioned through a gear train 203 by the waste gate motor 204.

The waste gate motor 204 may be of the type disclosed in the aforesaid patent to Taylor which as shown herein is a capacitor type induction motor which is reversibly controlled by an amplifier 205; this motor is also of the same type as motors 12 and 92. The direction of rotation of the rotor of motor 204 depends upon the phase relationship between the voltage across terminals 210, 211 of amplifier 205 which are connected to the line 100 and the voltage across the signal input terminals 207, 208 which are connected to the input circuit of amplifier 205.

The signal input circuit of amplifier 205 extends from terminal 208, lead 214, impedance network 215, lead 225, impedance network 230, to ground, and to the grounded terminal 207 of amplifier 205.

The impedance network 215 comprises a waste gate motor servo balance potentiometer 216 and a main controller potentiometer 218 whose resistors are connected in parallel across the opposite ends of a secondary winding 220 of a transformer having a primary winding 34. A wiper 217 of the balance potentiometer is driven by motor 204. Wiper 219 of the main controller potentiometer is driven by the main controller 223. The main controller 223 may constitute apparatus responsive to changes in a condition which it is desired to maintain by operation of the waste gate. Such a condition responsive element is illustrated in the patent to Taylor 2,388,350 mentioned above and as in that patent may take the form of a device responsive to the pressure at the intake of the carburetor. The impedance network 215 constitutes a Wheatstone bridge whose output elements are wipers 217, 219. Terminal 208 of amplifier 205 is connected to wiper 217 by means of lead 214.

The impedance network 230 comprises a turbo boost potentiometer 231 which has a resistor 233. Both ends of resistor 233 are joined and are connected through a loading resistor 234 to one end of a secondary winding 232 of a transformer having a primary winding 34. A center tap 235 of resistor 233 is connected to the opposite side of secondary winding 232. It may be seen that in any particular half cycle under consideration, irrespective of the direction in which wiper 237 of the turbo boost potentiometer 231 is moved from the center tap 233, the phase of the voltage between the wiper and the center tap does not change. The wiper 237 and the center tap 235 represent the output members of the turbo boost potentiometer 231. Wiper 237 is connected by means of lead 225 to wiper 219 of network 215. The center tap 235 of potentiometer 231 is connected to ground.

A single pole single throw switch 239 is connected across lead 225 and center tap 235 whereby the wiper 237 and the center tap may be directly connected to prevent any voltage being developed between the wiper 237 and center tap 235 upon movement of the wiper.

Operation

With the apparatus as shown, the aircraft is assumed to be flying on a selected course or heading and to be in a level position laterally and longitudinally. At this time, the input circuit to amplifier 18 which controls the aileron servomotor 12 is in balanced condition with the wiper 33 at the electrical center of its potentiometer resistor and the wiper 37 of network 30 also at the electrical center of its potentiometer resistor.

The wipers 50 and 54 of the network 44 are at the electrical centers of their respective potentiometer resistors with no difference of potential between wipers 50 and 54.

The formation stick 70 is in a normal position and the wiper 65 is at the electrical center of its potentiometer resistor so that there is no difference of potential between the wiper 65 and center tap 67 of the secondary winding 64 of network 60. There will thus be no difference of potential between the wiper 69 of network 60 and the grounded end of the resistor of potentiometer 68.

If the aircraft be not flying in a level lateral position, the centering wiper 54 may be adjusted by knob 55 to set up a signal in the input circuit of amplifier 18 thereby causing the servomotor 12 to operate the aileron and through the follow up arrangement drive the follow up wiper 33 to balance the voltage in the input circuit at which time the voltage between wipers 33, 36 is equal and opposite to that between wipers 50, 54. The motor 12 applies, as selected, the proper amount of aileron to cause the aircraft to fly in a level lateral position.

Similarly if the aircraft tends to turn about the yaw axis, the input circuit to rudder servomotor amplifier 98 will have a signal impressed upon it by the operation of the centering knob 127 which causes the amplifier 98 to respond to the input signal and effect rotation of motor 92 to position the rudder and to operate the follow up wiper 114 to balance the input circuit. The wiper 114 will be driven in the rebalancing operation until the voltage between wiper 114 and wiper 115 is equal and opposite to the voltage between the wiper 123 and wiper 125 of network 121. The rudder may thus be positioned until the aircraft tends to maintain its desired course.

The aircraft is automatically maintained on the desired course by the directional gyro 51. If the aircraft should deviate from the desired heading, the directional gyro 51 will operate the wiper 50 of the directional gyro aileron potentiometer 45 and the wiper 123 of the directional gyro rudder potentiometer 122 setting up a voltage between wipers 50, 54 and 123, 125 to impress a signal on amplifiers 18 and 98 whereby the motors 12 and 92 position their respective control surfaces. The servomotors 12 and 92 operate their follow up wipers 33 and 114 until the respective input circuits to amplifiers 18 and 98 are in balanced condition.

The vertical gyro in response to the banking of the aircraft moves the wiper 37 of the roll axis potentiometer and wiper 115 of the vertical gyro rudder potentiometer to set up such a signal in their respective networks that the ailerons and rudder are moved to normal position.

The aircraft under the banked attitude moves toward the desired heading during which movement the directional gyro signal continually decreases from its original value causing an unbalance in the input circuits of both amplifier 18 and 98. This unbalance in the signal circuits causes a reverse direction of rotation of servomotors 12 and 92 until rebalancing of the respective input circuits is again obtained. The rudder and ailerons are also moved back to remove the bank of the aircraft. The movement given wipers 33 and 114 by gyro 51 is the reverse of that given them originally, and they move toward the center position of their respective resistors.

The vertical gyro in response to the decrease in bank of the aircraft moves its sliders 37, 115 in the aileron and rudder networks back toward normal. This movement causes the operation of the servomotors to balance the networks and place the ailerons and rudder in normal position.

When the aircraft has again attained the desired heading the directional gyro 51 has moved the wipers 50 and 123 back to the electrical centers of their resistors the vertical gyro 40 has returned wipers 37 and 115 to normal position and the servomotors 12 and 92 have moved the wipers 33 and 114 back to the center of their potentiometer resistors and have returned the ailerons and rudder to normal position.

In a similar way, the vertical gyro 40 operates its banking potentiometers 112 and 37 in the rudder and aileron input circuits respectively to control the operation of the rudder and ailerons to maintain the aircraft in a correct lateral position and to correct for any tilting of the aircraft about the roll axis.

If the pilot desires he may effect change in the course of the aircraft or change the heading of the aircraft, by the operation of the formation stick 70. If a change in heading to the right be desired, the formation stick 70 is rotated clockwise. This rotation of the formation stick 70 and the spindle 73 causes the cam 74 to move contact 76 into engagement with contact 77. The circuit to the directional arm lock 80 is thereby completed as described and the directional arm lock operates to prevent transmission of movement from the directional gyro 51 to the wiper 50 of the directional gyro banking potentiometer 45 and to wiper 123 of the directional gyro rudder potentiometer 122. The wiper 50 therefore is not moved with respect to the resistor of potentiometer 45 despite relative movement of the aircraft and directional gyro. Similarly in the rudder network the wiper 123 of the directional gyro rudder potentiometer 122 is not moved with respect to its potentiometer resistor. Assuming now that with wiper 65 to the right with respect to center tap 67 by the operation of the formation stick 70, that the voltage between wiper 65 and center tap 67 is in phase with the voltage across the line 100. A voltage will therefore be applied across the ends of the resistor of the trimmer potentiometer 68 and wiper 69 may be positioned to select any portion of this voltage. The voltage from the formation stick potentiometer 61 as thus modified by the trimmer potentiometer 68 is applied on the one hand through lead 59 to the aileron amplifier input circuit and through lead 130 on the other hand to the rudder amplifier signal input circuit.

The in phase input signal from the impedance network 60 unbalances the input circuit of amplifier 18 and causes the servomotor 12 to rotate whereby the left aileron is lowered and the right aileron is raised. During the positioning of the ailerons the follow up wiper 33 is driven by the servomotor 12 toward the right until the voltage between wiper 33 and wiper 37 of network 30 is equal and opposite to the voltage between the wiper 69 of the trimmer potentiometer 68 of network 60 and ground. With equal and opposite voltages in the input circuit the amplifier input is in balance condition and the aileron motor 12 stops rotating.

In the rudder network the in phase signal from impedance network 60 unbalances the input circuit of amplifier 98 and causes the rudder servomotor 92 to rotate to position the rudder toward the right. During the positioning of the rudder, the rudder servomotor 92 also drives the follow up wiper 114 of the servo balance potentiometer 111 toward the right until the voltage between wipers 114 and 115 of network 110 is equal and opposite to the voltage between wiper 69 of the trimmer potentiometer 68 and ground at which time the input circuit of amplifier 98 is in balance condition and the motor 92 stops rotating.

The movement of the ailerons causes the aircraft to bank or tilt about its roll axis. The vertical flight gyro 40 responds to the tilt of the aircraft about its roll axis and adjusts the wiper 115 of the vertical gyro rudder potentiometer 112 in the rudder network and the wiper 37 of the vertical gyro banking potentiometer 36 in the aileron network to the left whereby the input circuits to amplifiers 98 and 18 are unbalanced respectively. The vertical gyro attempts to correct for the tilt of the aircraft and consequently moves the wipers 115 and 37 in proportion to the degree of the bank attained by the plane. The rudder and aileron networks are now unbalanced in an opposite direction from that incurred by the operation of the formation stick 70. The rudder servomotor amplifier 98 now operates due to the unbalance of its input circuit and causes the motor 92 to rotate to move the rudder back to the normal position and at the same time it drives the wiper 114 of the rudder servo balance potentiometer 111 back to normal position. The motor 92 continues to rotate until the voltage between wiper 114 and wiper 115 of network 110 in the rudder network is equal and opposite to the voltage between the wiper 69 of the trimmer potentiometer 68 and ground. This equality of voltage is predicated upon the assumption that the rudder in normal position is centered and that the centering wiper 125 is at the center of its resistor.

Similarly, in the aileron network, the amplifier 18 responds to the vertical flight gyro signal from the potentiometer 36 and causes the aileron servomotor 12 to operate in the reverse direction from its original rotation to move the ailerons back to the center position and move wiper 33 of the servo balance potentiometer 31 back to center position. With the signal input circuit of amplifier 18 in balance condition again the voltage between wiper 37 of the vertical gyro aileron potentiometer 36 and the wiper 33 is equal and opposite to the voltage between wiper 69 of the trimmer potentiometer 68 of network 60 and ground.

The pilot maintains the formation stick 70 in the position to which he had moved it to obtain the desired banking angle.

The operation of the formation stick 70 has also rotated wiper 237 of the turbo boost potentiometer 231 to the left of its center position. The movement of wiper 237 causes an in phase signal to be present between the center tap 235 and wiper 237. This signal is applied to the input circuit of amplifier 205 which operates the waste gate motor 204. The motor 204 through the gear train 203 moves the waste gate 200 toward the closed position. During the positioning of the waste gate 200, the waste gate motor 204 drives its follow up wiper 217 toward the right until the input circuit to amplifier 205 is in balance condition. In this balance condition, the waste gate motor 204 stops rotating. The main controller 223 opposes this closing of the waste gate 200 and tends to provide a signal to open the waste gate. The opposite effects of the main controller 223 and potentiometer 231 is to shift the balance point of the input of amplifier 205 and permit slight closure of valve 200.

The movement of the waste gate 200 toward the closed position results in a larger proportion of the exhaust gases from the aircraft engine passing through the exhaust gas driven turbine which drives the supercharger as disclosed in the aforesaid patent to Taylor. The increase in the turbine's speed increases the power developed by the aircraft engine. This increase in power developed by the aircraft engine is supplied therefore when the aircraft is banking as it turns. In other words, while the aircraft is in a banked turn, the airplane engine develops more power than when in normal straight flight.

The aircraft now flies with its rudder and ailerons in normal center position as described with the craft in a banked position as it turns. The aircraft engine develops greater power during this banked position of the aircraft. This is highly desirable inasmuch as an airplane when banked tends to lose altitude and speed. The increased power supplied by the engine in accordance with the present invention counteracts this tendency so that the airplane is maintained at the desired altitude and speed, despite the turn.

As the aircraft approaches the desired heading, the pilot moves the formation stick 70 back to its center position. Wiper 65 of the formation stick potentiometer 61 in network 60 is moved counterclockwise or back to the electrical center of its potentiometer resistor. This movement of wiper 65 decreases the in phase signal in the input circuits to amplifiers 18 and 98 leaving a preponderantly out-of-phase signal in these amplifier input circuits. The amplifier 18 responds to the preponderant out-of-phase signal and causes the aileron servomotor 12 to operate whereby the right aileron is lowered and the left aileron is raised. The aileron servomotor 12 also drives its follow up wiper 33 of potentiometer 31 toward the left from its center position until there is no voltage difference between wipers 33 and 37 in the aileron network.

Similarly in the rudder network, a preponderant out-of-phase signal exists in the input circuit to amplifier 98. Amplifier 98 operates and causes the rudder servomotor 92 to operate to move the rudder to the left from its center position. The servomotor 92 also moves the wiper 114 of the servo balance potentiometer 111 toward the left until there is no voltage between wipers 114 and 115. The applied lowered right aileron and raised left aileron together with the applied left rudder causes the aircraft to reduce its angle of bank and to begin to steady on the desired heading.

With the angle of bank being reduced under the applied ailerons as described, the tilt of the aircraft decreases and the vertical gyro 40 responds to the decreased tilt and moves the wiper 115 of the rudder banking potentiometer 112 towards the right and the wiper 37 of the vertical gyro aileron potentiometer 36 toward the right. The movement of wiper 115 of potentiometer 112 causes an in phase voltage to exist between wiper 115 and wiper 114 of network 110 in the rudder network. The amplifier 98 responds to this in-phase signal and causes the rudder servomotor 92 to move the rudder toward the right or toward the center position since it had been in a left position. The rudder servomotor 92 also drives the wiper 114 of the rudder servo balance potentiometer 111 toward the right until the voltage between wipers 114 and 115 is reduced to zero.

In the aileron network, the decrease in bank and the subsequent response of the vertical gyro 40 to the decrease in bank causes the wiper 37 as stated to be moved to the right resulting in a preponderantly in phase signal in the input control circuit to the amplifier 18 of the aileron network. The amplifier 18 responds to this in phase signal and causes the aileron servomotor 12 to rotate moving the ailerons toward the center position. The aileron servomotor 12 also drives the wiper 33 of the servo balance potentiometer toward the right until there is no voltage between wiper 33 of the servo balance potentiometer and wiper 37 of the vertical gyro banking potentiometer 36. The input circuit to amplifier 18 is therefore balanced and the motor 12 stops rotating.

The action of the aileron motor 12 and the rudder motor 92 is substantially continuous. The gradual decrease in the right bank due to the lowered right aileron and the raised left aileron results in a decrease in the controlling signal from the vertical gyro. The aircraft ultimately reaches a level lateral position and is headed on the newly selected course with the aileron and rudder control surfaces in unoperated position. The vertical gyro operated wipers 115 and 37 and the follow up wipers 33, 114 are in normal position, and the rudder and aileron amplifier input control circuits are in balanced condition. With the formation stick 70 in normal position, the directional arm lock 80 is no longer maintained operative and the operative transmission connection between the directional gyro 51 and the wipers 50 and 123 of the aileron potentiometer and the rudder potentiometer is again completed.

With respect to the operation of the waste gate 200 while the formation stick 70 is being returned to normal position, the counterclockwise movement of formation stick 70 moves the wiper 237 from its left position toward the center tap 235 of resistor 233. The impedance network 230 now decreases the in phase signal supplied to the input circuit of amplifier 205 and results in a preponderantly out of phase signal in this input circuit. The amplifier 205 responds to the out of phase signal and causes the waste gate motor 204 to rotate thereby moving the waste gate 200 toward the open position. The waste gate motor 204 also drives the wiper 217 of the servo balance potentiometer toward the left from its right position. This movement given to the waste gate 200 by the motor 204 is continuous and when the formation stick 70 is in normal position the wiper 237 is at the center tap 235 of resistor 233 and the wiper 217 of the servo balance potentiometer has been returned to the center of the resistor of follow up potentiometer 216. The waste gate 200 is now in the same position as when the change in heading was initiated.

Should it be desired to operate the formation stick 70 to change the course of the aircraft without affecting the power of the engine which propels the aircraft the single throw switch 239 may be moved counterclockwise from its position illustrated. The new position of the switch 239 will close a circuit which will by-pass the impedance network 230 whereby the conventional supercharger control may still function. As evident from the drawing, the operation of switch 239 connects directly lead 225 to ground whereby the network 230 is by-passed.

From a consideration of the above description, it is apparent that I have provided apparatus for an aircraft whereby the aircraft may be placed in a bank turn and concomitantly have the power developed by the propelling means increased in proportion to the amount of bank. The conventional aircraft which does not vary the power in accordance with the amount of bank incurs a decrease in the vertical component of lift since the total resultant lift vector is considered perpendicular to the now banked aircraft wing surface. By increasing the power of the propelling means while the plane is in a bank turn the total lift may be increased and the vertical component of lift may be maintained substantially the same. Consequently the altitude of the aircraft is maintained substantially the same as before the aircraft went into the turn.

In addition this increase in power of the propelling means may tend to maintain the air speed of the craft which generally decreases when a craft goes into a banked turn.

While I have described one embodiment of my invention, it is not restricted to the specific arrangement disclosed but is defined by the appended claims.

I claim as my invention:

1. Control apparatus for an aircraft having a control surface for controlling the aircraft about one axis and a waste gate valve for varying the power of a propelling means for said aircraft, comprising; a first motor means connected to said control surface; a second motor means connected to said waste gate valve; control means for said first motor means comprising, means responsive to the degree of movement of the aircraft about one axis, a follow up controller driven by said first motor means, and a third selectively operable controller; a second control means for said second motor means comprising a follow up controller driven by said second motor means and a second operable controller; and means for operating said second operable controller in response to the operation of the third selectively operable controller.

2. Control apparatus for an aircraft having control surfaces for controlling the aircraft about two axes and having propelling means, comprising; a first operating means connected to the control surfaces for controlling the aircraft about one axis; a second operating means connected to the control surface for controlling the aircraft about a second axis; a first control means for said first operating means including means responsive to the tilt of the aircraft about said first axis, a follow up controller driven by said first operating means; a second control means for said second operating means including means responsive to the tilt of the aircraft about said first axis, a follow up controller driven by said second operating means; further operable means included in both control means; and means for varying the power of said propelling means upon operation of said further means.

3. Control apparatus for an aircraft having rudder and aileron control surfaces for controlling the aircraft about two axes and having propelling means, comprising; a first operating means connected to the rudder control surface for controlling the aircraft about its vertical axis; a second operating means connected to the aileron control surfaces for controlling the aircraft about its roll axis; a first control means for said first operating means including means responsive to the change in attitude of the aircraft about said vertical axis, a follow up controller driven by said first operating means; a second control means for said second operating means including means responsive to the change in attitude of the aircraft about said vertical axis, a follow up controller driven by said second operating means; further operable means included in both control means; and means for varying the power of said propelling means upon operation of said further means.

4. Control apparatus for an aircraft having rudder and aileron control surfaces for controlling the aircraft about two axes and having propelling means, comprising; a first operating means connected to the rudder control surface for controlling the aircraft about its vertical axis; a second operating means connected to the aileron control surfaces for controlling the aircraft about its roll axis; a first control means for said first operating means including means responsive to the change in attitude of the aircraft about said vertical axis for producing a rudder control signal dependent in magnitude upon the extent of said change in attitude, a follow up controller driven by said first operating means for producing a signal opposing said rudder control signal; a second control means for said second operating means including means responsive to the change in attitude of the aircraft about said vertical axis for producing an aileron control signal dependent in magnitude upon the extent of said change in attitude, a follow up controller driven by said second operating means for producing a signal opposing said aileron control signal; operable means for introducing a further signal into both of said control means for modifying the position of both said rudder and aileron control surfaces; signal responsive means for varying the power of said propelling means; and means controlled by said further operable means for producing a further signal for causing operation of said power varying means upon operation of said means.

WILLIAM J. McGOLDRICK.

REFERENCES CITED

The following references are of record in the file of this patent:

UNITED STATES PATENTS

| Number | Name | Date |
|---|---|---|
| 2,191,250 | Fischel | Feb. 20, 1940 |
| 2,334,504 | Perina | Nov. 16, 1943 |
| 2,393,892 | De Ganahl | Jan. 29, 1946 |
| 2,423,337 | Moseley | July 1, 1947 |
| 2,464,629 | Young | Mar. 15, 1949 |
| 2,471,821 | Kutzler et al. | May 31, 1949 |
| 2,516,796 | Noxon et al. | July 25, 1950 |

OTHER REFERENCES

"Electronics" of October 1944, pages 110–112 and 117.